(12) United States Patent
Nishino et al.

(10) Patent No.: US 11,797,893 B2
(45) Date of Patent: Oct. 24, 2023

(54) MACHINE LEARNING FOR GENERATING AN INTEGRATED FORMAT DATA RECORD

(71) Applicant: FUJITSU LIMITED, Kawasaki (JP)

(72) Inventors: Takuya Nishino, Atsugi (JP); Ryota Kikuchi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 955 days.

(21) Appl. No.: 16/362,691

(22) Filed: Mar. 25, 2019

(65) Prior Publication Data
US 2019/0303794 A1    Oct. 3, 2019

(30) Foreign Application Priority Data
Mar. 30, 2018 (JP) .................. 2018-068375

(51) Int. Cl.
*G06N 3/08* (2023.01)
*G06N 20/10* (2019.01)
*G06N 20/20* (2019.01)
*G06N 3/045* (2023.01)

(52) U.S. Cl.
CPC .............. *G06N 20/10* (2019.01); *G06N 3/045* (2023.01); *G06N 3/08* (2013.01); *G06N 20/20* (2019.01)

(58) Field of Classification Search
CPC ...... G06N 20/10; G06N 20/20; G06N 3/0454; G06N 3/08
See application file for complete search history.

(56) References Cited

U.S. PATENT DOCUMENTS 11,308,403 B1 * 4/2022 Chou ................ G06N 20/00

FOREIGN PATENT DOCUMENTS

JP    2007-179542 A    7/2007

OTHER PUBLICATIONS

Rose Yu, Stephan Zheng, Anima Anandkumar, Yisong Yue. Long-term Forecasting using Tensor-Train RNNs. 2018. ICML (Year: 2018).*
Ibrahim Berkan Aydilekand Ahmet Arslan. A Novel Hybrid Approach to Estimating Missing Values in Databases Using K-Nearest Neighbors and Neural Networks. Jul. 2012. International Journal of Innovative Computing, Information and Control (Year: 2012).*
Kandel et al., "Wrangler: Interactive Visual Specification of Data Transformation Scripts", 2011 (Year: 2011).*
Japanese Office Action dated Jan. 11, 2022, in corresponding Japanese Patent Application No. 2018-068375.
Takuya Nishino et al., "Detections of attacker's behavior using graph classification based on tensor decomposition", Computer Security Symposium 2017, Privacy Workshop 2017, IPSJ Symposium Series, vol. 2017, No. 2 [CD-ROM], Information Processing Society of Japan, Computer Security Special Interest Group, Security Psychology and Trust (SPT) Group, pp. 7-14.

* cited by examiner

*Primary Examiner* — Selene A. Haedi
(74) *Attorney, Agent, or Firm* — XSENSUS LLP

(57) ABSTRACT

A non-transitory computer-readable recording medium stores a program that causes a computer to execute a process including: inputting input data including one or more records that have one of a plurality of formats, each of the plurality of formats including a plurality of items; generating conversion data by generating an integrated record having an integrated format from the one or more records; and causing a learner to execute a learning process using the conversion data as input tensor, the learner performing deep learning by performing tensor decomposition on input tensor.

6 Claims, 16 Drawing Sheets

| 10:00-10:10 | | | |
|---|---|---|---|
| COMMUNI-CATION SOURCE HOST | COMMUNI-CATION DESTINA-TION HOST | PORT | COMMUNI-CATION AMOUNT |
| S1 | R1 | P1 | 3 |
| S2 | R1 | P2 | 1 |
| S1 | R2 | P2 | 2 |
| ... | ... | ... | |

+

14

| 10:00-10:10 | |
|---|---|
| COMMAND A | COMMAND B |
| T1 | R1 |
| T2 | R1 |
| T1 | R2 |
| ... | ... |

| 1/1 TO 1/21 | |
|---|---|
| WORKING SECTION | WORKING HOUR |
| NORMAL | 8 |
| NORMAL | 9 |
| NORMAL | 10 |
| ... | ... |

+

16

| 1/22 TO 1/31 | |
|---|---|
| WORKING SYSTEM | WORKING HOUR |
| FLEXIBLE | -- |
| FLEXIBLE | -- |
| FLEXIBLE | -- |
| ... | ... |

FIG.6

| TIME | TRANS-MISSION IP | RECEPTION IP | RECEPTION PORT NO. | TRANS-MISSION PORT NO. | COMMAND ATTRIBUTE | COMMAND PATH |
|---|---|---|---|---|---|---|
| 00:00 | 120.10.10.1 | 10.16.100.1 | 80 | 56000 | NA | NA |
| 00:01 | NA | NA | NA | NA | Launch | Conhost.exe |
| 00:02 | NA | NA | NA | NA | Access | ProcessCapture.exe |
| 00:03 | 10.16.100.1 | 120.10.10.1 | 56000 | 80 | NA | NA |

FIG.8

| TIME | TRANS-MISSION IP | RECEPTION IP | RECEPTION PORT NO. | TRANS-MISSION PORT NO. | COMMAND ATTRIBUTE | COMMAND PATH |
|---|---|---|---|---|---|---|
| 00:00 | 120.10.10.1 | 10.16.100.1 | 80 | 56000 | ? | ? |
| 00:01 | 120.10.10.1 | 10.16.100.1 | 80 | 56001 | ? | ? |
| 00:02 | 120.10.10.1 | 10.16.100.1 | 80 | 56002 | ? | ? |
| 00:03 | 120.10.10.1 | 10.16.100.1 | 80 | 56003 | ? | ? |
| 00:04 | 10.120.110.1 | 10.16.100.2 | 80 | 440 | ? | ? |
| 00:05 | ? | ? | ? | ? | Launch | Conhost.exe |
| 00:06 | ? | ? | ? | ? | Access+cmd | ProcessCapture.exe |
| 00:07 | 10.16.100.1 | 120.10.10.1 | 56003 | 80 | ? | ? |

| TIME | TRANS-MISSION SOURCE IP | TRANS-MISSION DESTINA-TION IP | TRANS-MISSION SOURCE PORT | TRANS-MISSION DESTINA-TION PORT | COMMAND TYPE | COMMAND CONTENT |
|---|---|---|---|---|---|---|
| 23:50 | 120.10.10.1 | 10.16.100.5 | 443 | 56003 | ? | ? |
| ⋮ | | | | | | |
| 00:00 | 120.10.10.1 | 10.16.100.1 | 80 | 56003 | ? | ? |
| 00:01 | 10.120.110.1 | 10.16.100.2 | 80 | 440 | ? | ? |
| 00:02 | ? | ? | ? | ? | Launch | Conhost.exe |

| TIME | TRANS-MISSION SOURCE IP | TRANS-MISSION DESTINA-TION IP | TRANS-MISSION SOURCE PORT | TRANS-MISSION DESTINA-TION PORT | COMMAND TYPE | COMMAND CONTENT |
|---|---|---|---|---|---|---|
| 23:50 | 120.10.10.1 | 10.16.100.5 | 443 | 56003 | NA | NA |
| ⋮ | | | | | | |
| 00:00 | 120.10.10.1 | 10.16.100.1 | 80 | 56003 | NA | NA |
| 00:01 | 10.120.110.1 | 10.16.100.2 | 80 | 440 | NA | NA |
| 00:02 | 10.120.110.1 | 10.16.100.2 | 80 | 440 | Launch | Conhost.exe |

— L1

122b

| TIME | TRANS-MISSION SOURCE IP | TRANS-MISSION DESTINA-TION IP | TRANS-MISSION SOURCE PORT | TRANS-MISSION DESTINA-TION PORT | COMMAND TYPE | COMMAND CONTENT |
|---|---|---|---|---|---|---|
| 23:50 | 120.10.10.1 | 10.16.100.5 | 443 | 56003 | NA | NA |
| ⋮ | | | | | | |
| 00:00 | 120.10.10.1 | 10.16.100.1 | 80 | 56003 | NA | NA |
| 00:01 | 10.120.110.1 | 10.16.100.2 | 80 | 440 | NA | NA |
| 00:02 | 120.10.10.1 | 10.16.100.1 | 80 | 56003 | Launch | Conhost.exe |
| 00:02 | 10.120.110.1 | 10.16.100.2 | 80 | 440 | Launch | Conhost.exe |

— L2

⋮

122n

| TIME | TRANS-MISSION SOURCE IP | TRANS-MISSION DESTINA-TION IP | TRANS-MISSION SOURCE PORT | TRANS-MISSION DESTINA-TION PORT | COMMAND TYPE | COMMAND CONTENT |
|---|---|---|---|---|---|---|
| 23:50 | 120.10.10.1 | 10.16.100.5 | 443 | 56003 | NA | NA |
| ⋮ | | | | | | |
| 00:01 | 10.120.110.1 | 10.16.100.2 | 80 | 440 | NA | NA |
| 00:02 | 120.10.10.1 | 10.16.100.5 | 443 | 56003 | Launch | Conhost.exe |
| ⋮ | | | | | | |
| 00:02 | 10.120.110.1 | 10.16.100.2 | 80 | 440 | Launch | Conhost.exe |
| 00:02 | 120.10.10.1 | 10.16.100.1 | 80 | 56003 | Launch | Conhost.exe |
| 00:02 | 10.120.110.1 | 10.16.100.2 | 80 | 440 | Launch | Conhost.exe |

— Ln

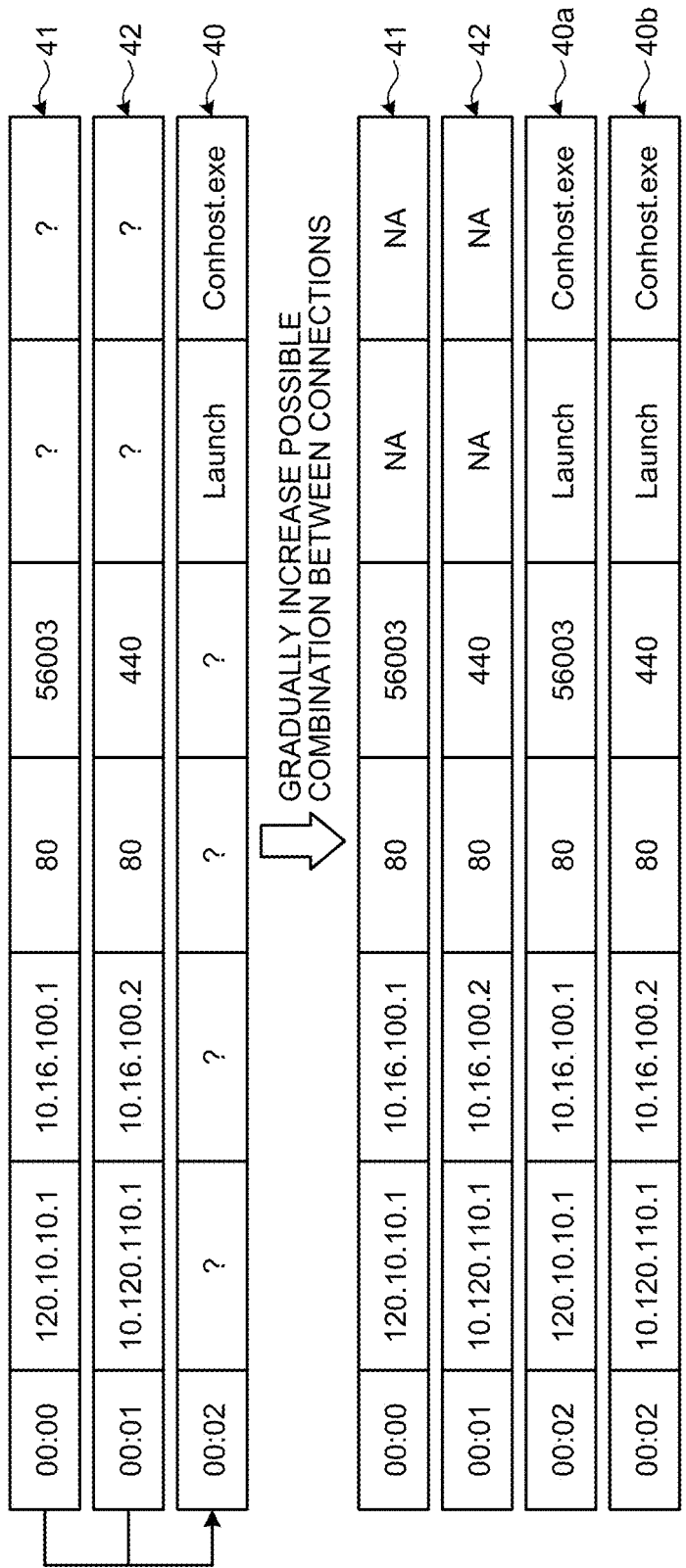

MACHINE LEARNING FOR GENERATING AN INTEGRATED FORMAT DATA RECORD

CROSS-REFERENCE TO RELATED APPLICATION

This application is based upon and claims the benefit of priority of the prior Japanese Patent Application No. 2018-068375, filed on Mar. 30, 2018, the entire contents of which are incorporated herein by reference.

FIELD

The embodiment discussed herein is related to a computer-readable recording medium, a learning method, and a learning device.

BACKGROUND

In recent years, machine learning in which various kinds of data is used as an input is performed. If the input data used in machine learning is, for example, data acquired from various sensors or devices, in some cases, a plurality of records included in the input data has a plurality of different formats or the value of the number of records is variable. When machine learning is performed on this type of input data, machine learning is performed after having performed, for example, conversion in order to unify the input data. Furthermore, there is a known graph structure learning technology (hereinafter, a device that performs this type of graph structure learning is referred to as "deep tensor") for enabling to perform deep learning on data having a graph structure.

Patent Document 1: Japanese Laid-open Patent Publication No. 2007-179542

However, when generating integrated records having unifying items each having a different format, there is a need to set a certain value in an integrated record also regarding the item in which no value is present in the original data. For example, if learning is performed by generating an integrated record in which a value of the item that does not contain a value in the original data is set to not available (NA), the setting of the value of "NA" in the integrated record results in the state in which a new feature value indicating "absence" of data has been added. In this case, in data having the graph structure, learning is performed by giving meaning NA, which is set in accordance with the generation of the integrated records, as a node or a label, which may possibly be an obstruction of the distinction accuracy.

SUMMARY

According to an aspect of an embodiment, a non-transitory computer-readable recording medium stores a program that causes a computer to execute a process including: inputting input data including one or more records that have one of a plurality of formats, each of the plurality of formats including a plurality of items; generating conversion data by generating an integrated record having an integrated format from the one or more records; and causing a learner to execute a learning process using the conversion data as input tensor, the learner performing deep learning by performing tensor decomposition on input tensor.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram illustrating an example in a case where pieces of data each having a different format are desired to be integrated;

FIG. 4 is a diagram illustrating another example in a case where pieces of data each having a different format are desired to be integrated;

FIG. 6 is a diagram illustrating an example of an integrated record in which NA is added in a cell that becomes a blank field;

FIG. 8 is a diagram illustrating an example of data of communication and commands in a remote operation;

FIG. 14 is a diagram illustrating an example of a replication data storage unit;

FIG. 15 is a diagram illustrating an example of generating replication data.

DESCRIPTION OF EMBODIMENT

Preferred embodiments of the present invention will be explained with reference to accompanying drawings. The disclosed technology is not limited to the present invention. Furthermore, the embodiments described below may also be used in any appropriate combination as long as the embodiments do not conflict with each other.

Figure 1:
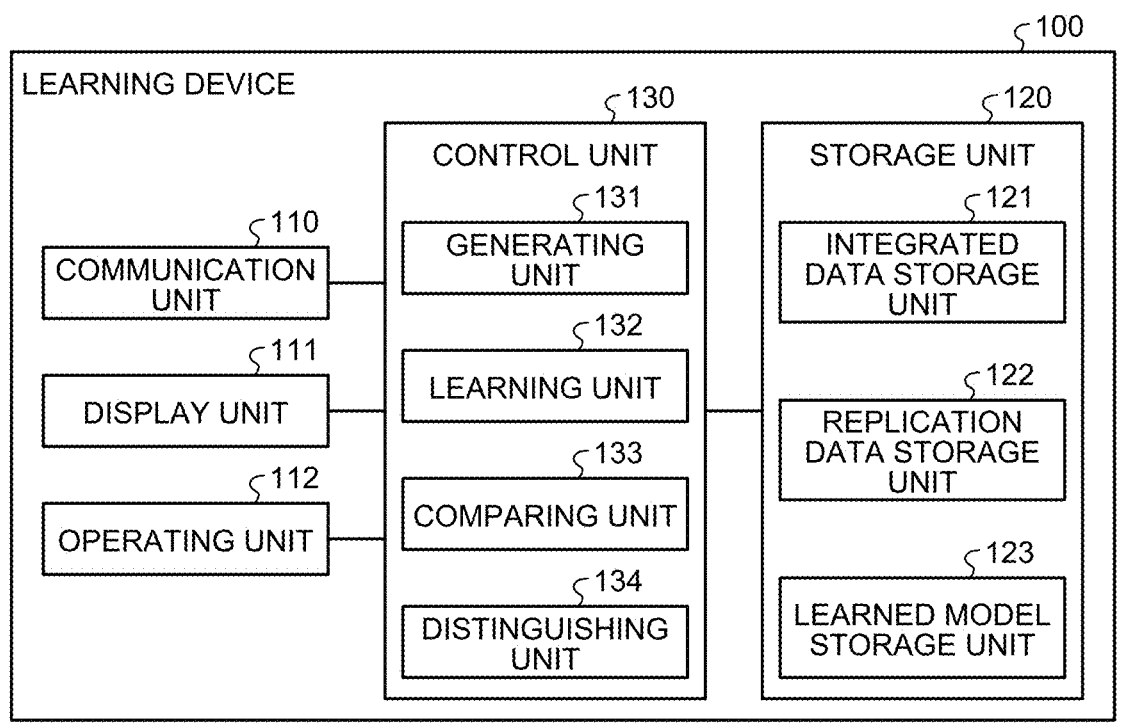
FIG. 1 is a block diagram illustrating an example of a configuration of a learning device according to an embodiment.

FIG. 1 is a block diagram illustrating an example of a configuration of a learning device according to an embodiment. A learning device 100 illustrated in FIG. 1 inputs input data in which a record that has one of a plurality of formats each having a plurality of items is used as a unit of data. The learning device 100 generates conversion data by generating a plurality of integrated records each having an integrated format from a plurality of records regarding each of the units of data included in the input data. The learning device 100 allows a learning machine, which performs deep learning by performing tensor decomposition on input tensor, to learn the conversion data. Consequently, the learning device 100 can prevent the degradation of the distinction accuracy due to the generation of the integrated record.

Figure 2:
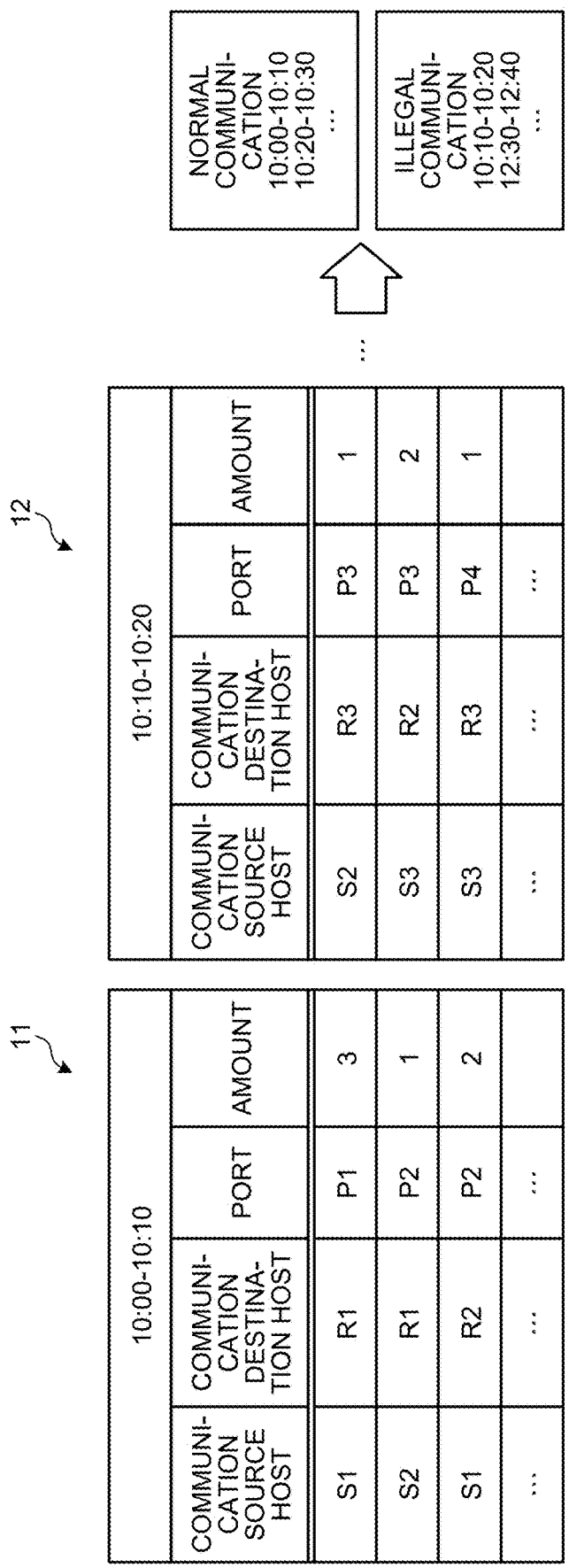
FIG. 2 is a diagram illustrating an example of data classification performed based on graph structure data.

First, graph structure data will be described by using FIG. 2 to FIG. 4. FIG. 2 is a diagram illustrating an example of data classification performed based on graph structure data. Data 11 and data 12 illustrated in FIG. 2 are graph structure data obtained by combining communication logs for each predetermined time zone. Furthermore, in a description below, the graph structure data is sometimes simply referred to as data. The data 11 and the data 12 represent the relationship between the information on, for example, a communication source host, a communication destination host, a port number, and a communication amount recorded in a communication log every 10 minutes. There may sometimes be a case in which the graph structure data indicated by the data 11 and the data 12 is desired to be classified into, for example, normal communication and illegal communication. Furthermore, is classification in this type of graph structure data, in general, a method called an edge list is used. In illegal communication, in some cases, the communication logs at the time at which, for example, a distributed denial of service (DDoS) attack or a targeted attack occurs are desired to be classified. However, for example, more than 100 communication logs are recorded in an hour; therefore, it is difficult to find illegal communication from a large number of communication logs by persons.

Furthermore, as another example, in some cases, transaction histories at the time at which money-laundering or a bank transfer fraud occurs are desired to be classified from data that indicates the relationship between the information, such as a remittance source account, a remittance destination account, and a branch name, recorded in the transaction histories of a bank. Regarding the transaction history, also, for example, more than 100 transaction histories are recorded in an hour; therefore, it is difficult to find illegal transaction history from a large amount of transaction history by persons.

In contrast, it is conceivable to distinguish such illegal communication by performing machine learning by integrating a plurality of logs. When integrating a plurality of logs, in order to match the data format that can be used in machine learning, complement is needed among logs each having a different type. For example, there may be a case in which communication logs and command logs are desired to be integrated or there may be a case in which personnel information and attendance information are desired to be integrated. In the logs each having a different type, the quality and the amount of information are different, such as the number of records, different generation sources, time lag, a change in working section, or the granularity of data.

FIG. 3 is a diagram illustrating an example in a case where pieces of data each having a different format are desired to be integrated. Data 13 and data 14 illustrated in FIG. 3 are examples of a communication log and a command log, respectively, and are pieces of data each having a different format but are desired to be integrated because these pieces of data are in the same time zone.

FIG. 4 is a diagram illustrating another example in a case where pieces of data each having a different format are desired to be integrated. Data 15 and data 16 illustrated in FIG. 4 are example of working data in a case where a working section has been changed in the middle of a month and in a case where the data has a different format but are desired to be integrated because the data is related to the same person. In the example illustrated in FIG. 4, even the working hour itself is present even if the working hour is changed from the normal working category to flexible working category, the working hours are hidden in the data 16. Namely, the example illustrated in FIG. 4 is a case in which, even in a case of the occurrence of a change in a working section, the graph structure data is desired to be generated on a monthly bases.

Figure 5:
FIG. 5 is a diagram illustrating an example of an integrated record of pieces of data each having a different format.

In the following, integrating data will be described by using FIG. 5 to FIG. 6 in a case of, as an example, communication and command. FIG. 5 is a diagram illustrating an example of an integrated record of pieces of data each having a different format. In the example illustrated in FIG. 5, data 17 is generated by integrating a log A that is an example of a communication log of Windows (registered trademark) and a log B that is an example of a command start-up log of Windows. In the data 17, both of the logs are stored in the integrated record having the integrated format of each of the log A and the log B. Furthermore, the data 17 can be conceived as a 6-dimensional tensor.

The integrated record in the data 17 has items, such as, as the integrated format, "time", "transmission Internet Protocol (IP)", "reception IP", "reception port No", "transmission port No", "command attribute", and "command path". From among the items of the integrated format, the items of "time", "transmission IP", "reception IP", "reception port No", and "transmission port No" are associated with the log A. Furthermore, the items of "time", "command attribute", and "command path" are associated with the log B. Furthermore, because the item of "time" is present in both of the logs, the item of "time" is integrated into a single item. Furthermore, in the integrated record, the item in which data is insufficient becomes a blank field and is represented by "?" in the example illustrated in FIG. 5.

In the data 17, the first and the fourth lines are the integrated records associated with the log A, whereas the second and the third lines are the integrated records associated with the log B. Consequently, in the first and the fourth lines, the items of "command attribute" and "command path" become blank files, whereas, in the second and the third lines, the items of "transmission IP", "reception IP", "reception port No", and "transmission port No" become blank fields. In the integrated records in each of which a cell having a blank field is present, the blank fields need to be complemented by some data. However, in a method for complementing blank fields, various hypotheses or techniques are present in a mixed manner and it is thus difficult to define that a certain hypothesis is valid for all of the pieces of data. In contrast, in the embodiment, by using a deep tensor with respect to the data in which the blank field has been appropriately complemented, generalization is improved by learning an optimum combination that is present in a background at the time of, for example, detection of an attack, such as malware, performed by a remote operation.

FIG. 6 is a diagram illustrating an example of an integrated record in which NA is added in a cell that becomes a blank field. Data 18 illustrated in FIG. 6 is data obtained in a case where data has been complemented by adding NA, i.e., a feature value indicting that data is not present, in the cell that becomes a blank field in the data 17. As indicated by data 18, if NA is complemented, the meaning as the graph structure data is different from that of the data 17.

Figure 7:
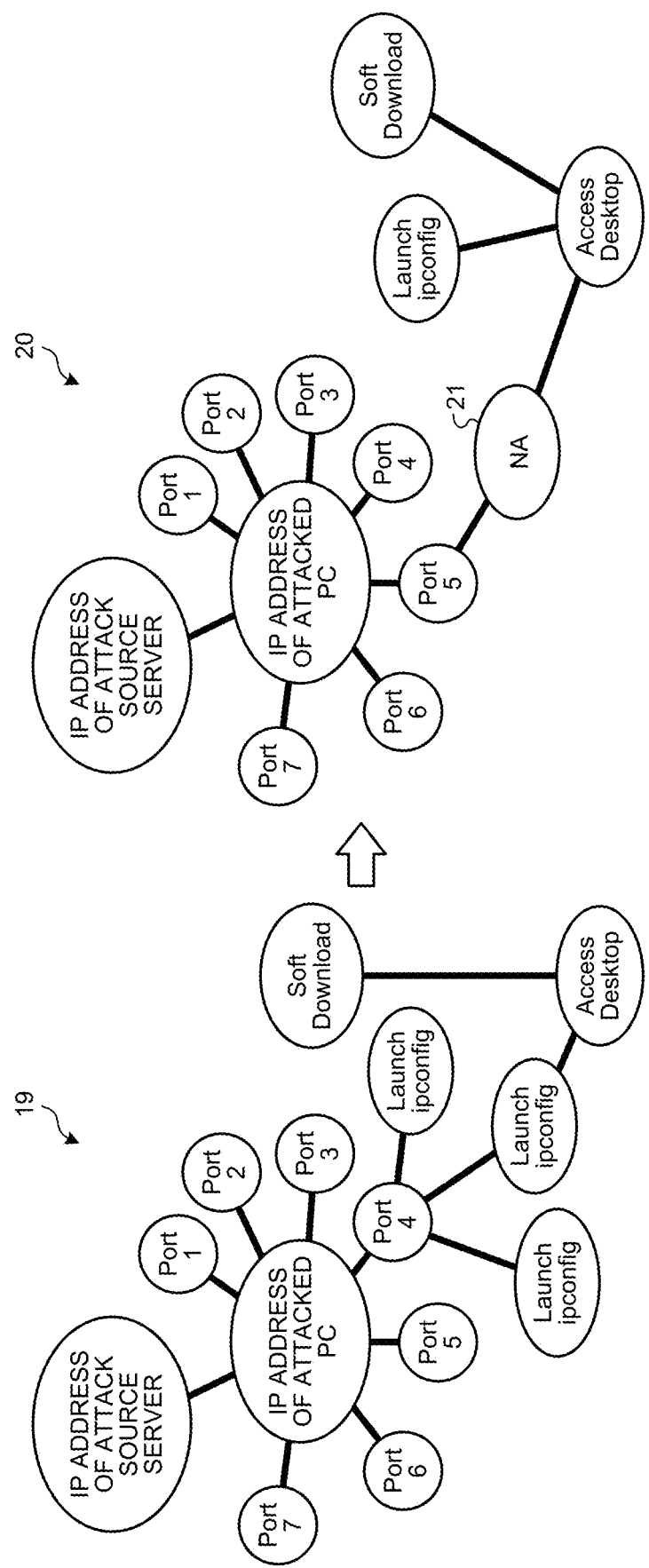
FIG. 7 is a diagram illustrating an example of a change in a graph in a case where NA has a meaning.

FIG. 7 is a diagram illustrating an example of a change in a graph in a case where NA has a meaning. A graph 19 illustrated in FIG. 7 is an example of a graph that is originally desired to be represented by using the data 17. In contrast, a graph 20 is an example of a graph that has been represented by using the data 18 that has been obtained by complementing the cell that becomes a blank field in the data 17 by NA. In the graph 20, pieces of information on the two logs are connected via an imaginary node 21 in which information is not originally supposed to be present. Consequently, the graph 20 is not able to reproduce the state in which certain communication is hidden in the back. Namely, complementing NA in the data 17 indicates a decrease in generalization of the learning model. In other words, a method for complementing a blank field by NA indicated by the data 18 decreases the classification accuracy with respect to new data. This causes a learning model to be generated from a point of view different from teacher labels in which determination is performed by persons; therefore, a difference with the learning models that is originally desired to be learned becomes large.

FIG. 8 is a diagram illustrating an example of data of communication and commands in a remote operation. Data 22 illustrated in FIG. 8 is an example of data that uses the integrated record in a case where a command related to a remote operation has been executed after an establishment action of communication in a case where the remote operation is performed. Regarding the establishment action of the communication, for example, as indicated by the integrated record from time "00:00" to "00:03", a port scan 23 is performed. After the port scan 23 has been performed, as indicated by the integrated records at time "00:05" and "00:06", command execution 24 is performed. However, in data 22, because normal communication or command execution that are different from the port scan 23 and the command execution 24 are present, it is difficult to allocate communication performed at the time closest to the command execution 24 to the command execution 24 by force. For example, in the data 22, the integrated record at time "00:04" represents a communication log that is not, related to the remote operation. In this way, there is a need to automatically extract, i.e., classify, the integrated records to be associated because various combination are present. Namely, this leads to increase generalization of learning models.

In the following, deep tensor and an amount of information of a partial structure will be described. Deep tensor mentioned here is deep learning performed by using tensors (graph information) as an input and automatically extracts, while performing learning of neural networks, partial graph structures (hereinafter, also referred to as partial structures) that contribute distinction. This extracting process is implemented by learning, while performing learning of neural networks, parameters of tensor decomposition of the input tensor data.

Figure 9:
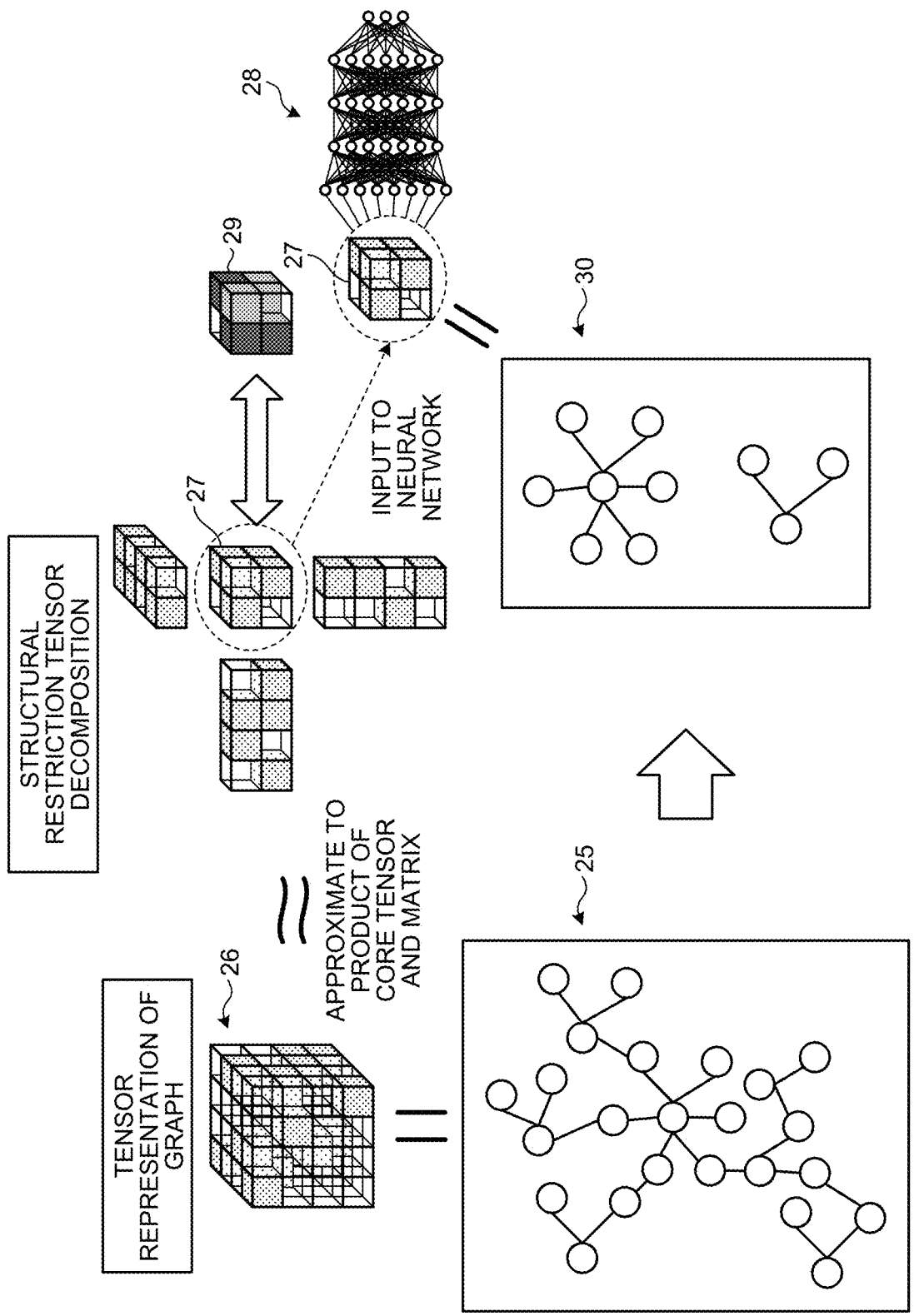
FIG. 9 is a diagram illustrating an example of learning in deep tensor.

FIG. 9 is a diagram illustrating an example of learning in deep tensor. As illustrated in FIG. 9, a graph structure 25 representing the entire of certain graph structure data can be represented as a tensor 26. Furthermore, the tensor 26 can be approximated to the product of a core tensor 27 and the matrix by structural restriction tensor decomposition in deep tensor, deep learning is performed by inputting the core tensor 27 to a neural network 28 and performs optimization using an extended error back propagation method so as to approach a target core tensor 29. At this time, if the core tensor 27 is represented by a graph, a graph 30 representing a partial structure in which the features have been condensed. Namely, deep tensor can automatically learn an important partial structure based on the core tensor from the entire graph.

Figure 10:
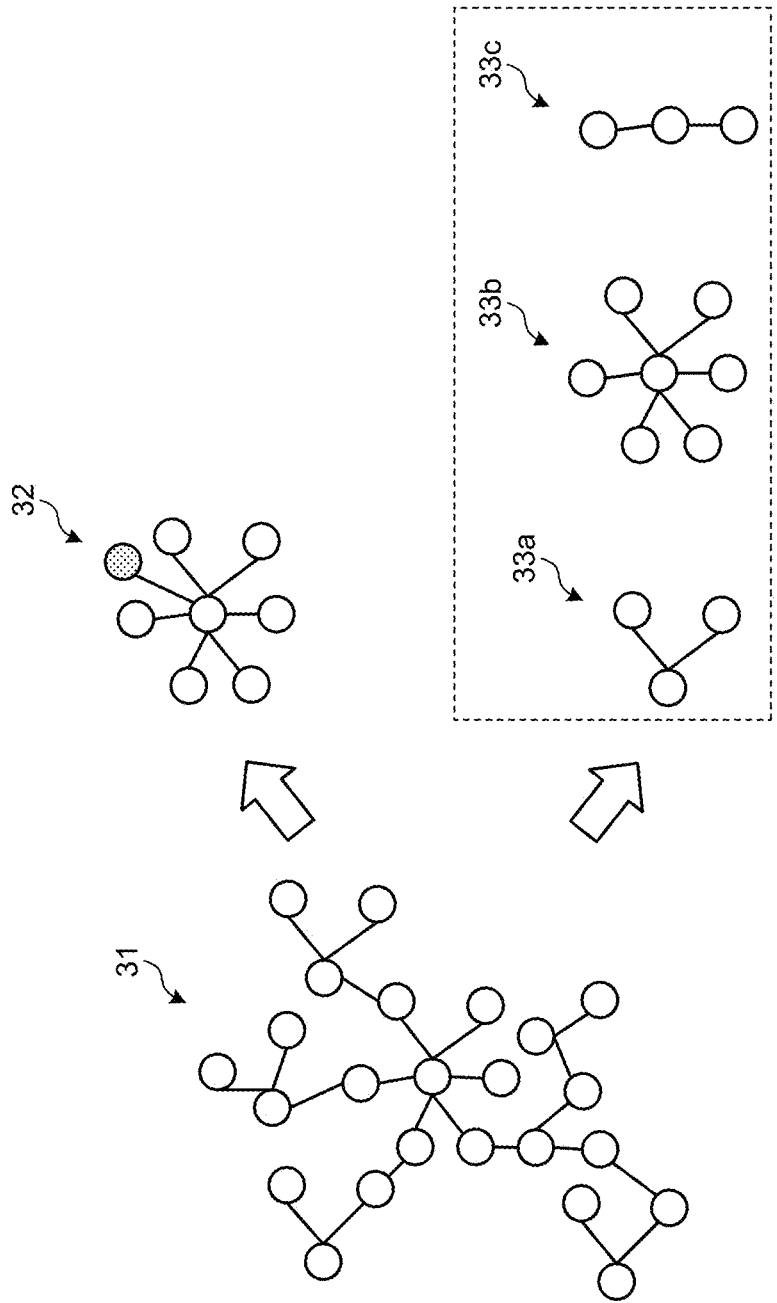
FIG. 10 is a diagram illustrating an example of comparing extraction of a partial structure obtained by deep tensor with a decision method of another partial structure.

FIG. 10 is a diagram illustrating an example of comparing extraction of a partial structure obtained by deep tensor with a decision method of another partial structure. In FIG. 10, a graph 31 that corresponds to the original graph is compared with in a case where a partial structure is decided by performing conversion based on a specific relationship, such as an adjacent relationship, and is compared with in case where a partial structure is extracted by using deep tensor. In a case where a partial structure is decided based on a specific relationship, learning is performed such that, for example, if the number of combinations of data is increased with respect to a partial structure 32, which has been decided that the other six nodes attached at the center of a certain node is the feature, the important thing is that the other seven or eight, nodes are attached to the partial structure 32. Namely, in the partial structure 32 that is based on the specific relationship, because a feature value (amount of information) varies, the classification result accordingly varies.

In contrast, in a case where an arbitrary partial structure that contributes classification is extracted by using deep tensor, partial structures 33a, 33b, and 33c that contribute classification are extracted regardless of the assumption that neighboring nodes are classified. At this time, even if a new piece of input data is input to deep tensor, if a partial structure that, contributes classification is not found, the partial structures 33a, 33b, and 33c are invariable with respect to the input data. Namely, in deep tensor, it is possible to extract a partial structure that contributes classification without assuming a specific connection.

Figure 11:
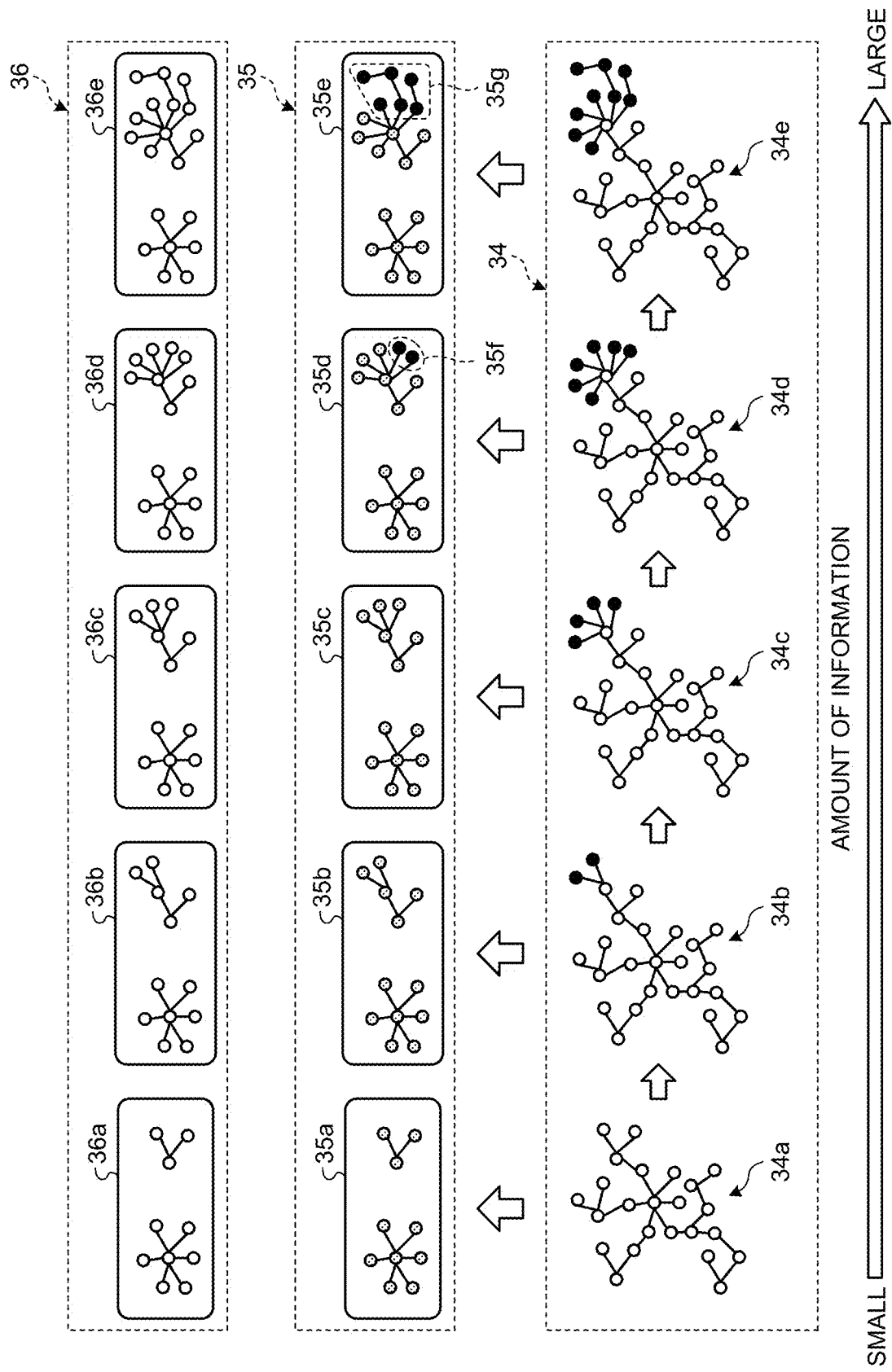
FIG. 11 is a diagram illustrating an example of comparing the amounts of information contained in partial structures.

FIG. 11 is a diagram illustrating an example of comparing the amounts of information contained in partial structures. In FIG. 11, a partial structure group 35 that performs extraction from an original data group 34 by using deep tensor is compared with a partial structure group 36 that is decided at the time of design. In the original data group 34, an amount of information is sequentially increased from data 34a to data 34e. In the partial structure group 35, the partial structures, i.e., from the partial structure 35a to a partial structure 35e, are the partial structures that have been extracted from the data 34a to data 34e, respectively. In the partial structure group 35, a partial structure is added to each of the partial structures, i.e., from the partial structure 35a to the partial structure 35e. At this time, if it is assumed that a partial structure 35f and a partial structure 35g have been added but are not important, it can be said that the partial structures subsequent to the partial structure 35d do not contribute the accuracy.

In contrast, in the partial structure group 36, the partial structures, i.e., from the partial structure 36a to a partial structure 36e, are the partial structures that have been extracted from the data 34a to data 34e, respectively. In the partial structure group 36, a partial structure is added to each of the partial structures, i.e., from the partial structure 36a to the partial structure 36e. At this time, because the partial structures, i.e., from a partial structure 36b to the partial structure 36e, have acquired all of the pieces of information about the variations starting from the partial structure 36a, an amount of noise is thus increased. Namely, in a partial structure 36d and the partial structure 36e, the partial structure 35f and the partial structure 35g, respectively, that have been added but are not important become noise.

Figures 12, 13:
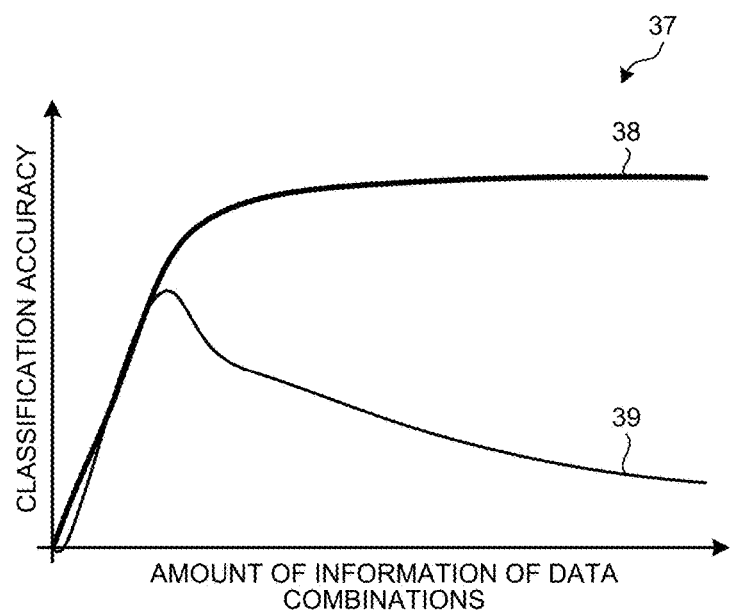
FIG. 12 is a diagram illustrating an example of a relationship between the classification accuracy and an amount of information of data combinations.
FIG. 13 is a diagram illustrating an example of an integrated data storage unit.

FIG. 12 is a diagram illustrating an example of a relationship between the classification accuracy and an amount of information of data combination. A graph 37 illustrated in FIG. 12 indicates, by using a graph 38 and a graph 39, the relationship between the classification accuracy and an amount of information in the partial structure group 35 that has been extracted by using deep tensor and an amount of information in the partial structure group 36 that is decided at the time of design. As indicated by the graph 38, in the partial structure group 35, even if an amount of information on the combination is increased, the classification accuracy is not decreased and maintains a certain level. Here, the amount of information of the combination is set such that the region in which complement is to be performed from among the combinations is gradually increased and stopped at the maximum level of the evaluation accuracy (classification accuracy). Namely, in deep tensor, because optimization is performed on the partial structure that contributes classification, an appropriate complement region can thus be obtained. Furthermore, as indicated by the graph 38, the complement pattern has been optimized when the result does not vary at all even if a complement pattern is changed (even if an amount of information on combination is increased).

In contrast, as indicated by the graph 39, in the partial structure group 36, if an amount of information on combination is increased, the classification accuracy is reduced caused by noise. Namely, in the partial structure group 36, because the result varies depending on an assumption or an algorithm, the assumption that the result does not vary at all does not hold even if a complement pattern is changed (even if an amount of information on combination is increased).

In this way, in deep tensor, it is possible to automatically extract, from the original large amount of input data, a core tensor in which the features have been condensed. At this time, because the core tensor is selected as the result of maximizing the detected classification accuracy, it is thus possible to automatically extract a partial graph structure that contributes classification. Namely, in the case of using the partial structure group 36 that is decided at the time of design, if an amount of information is increased, the classification accuracy is not increased because learning is not progressed due to large number of useless combinations. In contrast, in deep tensor, because presence or absence of noise is not concerned as long as a needed partial structure can be extracted, learning can be progressed even if the number of combinations is increased.

In the following, a configuration of the learning device 100 will be described. As illustrated in FIG. 1, the learning device 100 includes a communication unit 110, a display unit 111, an operating unit 112, a storage unit 120, and a control unit 130. Furthermore, the learning device 100 may also include, in addition to the functioning units illustrated in FIG. 1, various functioning units included in a known computer, for example, functioning units, such as input devices and audio output device.

The communication unit 110 is implemented by, for example, a network interface card (NIC), or the like. The communication unit 110 is a communication interface that is connected to another information processing apparatus in a wired or wireless manner via a network (not illustrated) and that manages communication of information with other information processing apparatuses. The communication unit 110 receives, for example, training data used for the learning or new data of distinction target from another terminal. Furthermore, the communication unit 110 sends the learning result or the distinguished result to the other terminal.

The display unit 111 is a display device for displaying various kinds of information. The display unit 111 is implemented by, for example, a liquid crystal display or the like as the display device. The display unit 111 displays various screens, such as display screens, that are input from the control unit 130.

The operating unit 112 is an input device that receives various operations from a user of the learning device 100. The operating unit 112 is implemented by, for example, a keyboard, a mouse, or the like as an input device. The operating unit 112 outputs, to the control unit 130, the operation input by a user as operation information. Furthermore, the operating unit 112 may also be implemented by a touch panel or the like as an input device, or, alternatively, the display unit 111 functioning as the display device and the operating unit 112 functioning as the input device may also be integrated as a single unit.

The storage unit 120 is implemented by, for example, a semiconductor memory device, such as a random access memory (RAM) or a flash memory, or a storage device, such as a hard disk or an optical disk. The storage unit 120 includes an integrated data storage unit 121, a replication data storage unit 122, and a learned model storage unit 123. Furthermore, the storage unit 120 stores therein information that is used for the process performed in the control unit 130.

The integrated data storage unit 121 stores therein integrated data in which the acquired training data is formed into the integrated format. FIG. 13 is a diagram illustrating an example of the integrated data storage unit. As illustrated in FIG. 13, the integrated data storage unit 121 has items, such as "time", "transmission source IP", "transmission destination IP", "transmission source port", "transmission destination port", "command type", and "command content". Furthermore, the items in the integrated data storage unit 121 are associated with, for example, the items of "time", "transmission IP", "reception IP", "reception port No", "transmission port No", "command attribute", and "command path", respectively, included in the data 17 illustrated in FIG. 5 described above.

The "time" is information indicating the time at, which log data of each of the integrated records was acquired. The "transmission source IP" is information indicating an IP address of, for example, a server or the like that performs a remote operation. The "transmission destination IP" is information indicating an IP address of, for example, a personal computer or the like that is subjected to the remote operation. The "transmission source port" is information indicating a port number of, for example, the server that performs the remote operation. The "transmission destination port" is information indicating a port number of, for example, the personal computer that is subjected to the remote operation. The "command type" is information indicating the type of the command that has been started up in, for example, the personal computer or the like that is subjected to the remote operation. The "command content" is information indicating the content of the command started up in, for example, the personal computer or like that is subjected to the remote operation. Namely, the integrated format in the integrated data storage unit 121 the format by integrating each of the items included in a plurality of formats.

A description will be given here by referring back to FIG. 1. The replication data storage unit 122 stores, in, for example, a cell that becomes a blank field of the first integrated record associated with the first format, replication data that is obtained by copying data of the second integrated record associated with the second format. FIG. 14 is a diagram illustrating an example of the replication data storage unit. As illustrated in FIG. 14, the replication data storage unit 122 sets, for example, the record associated with a command to the first integrated record and sets, for example, the record associated with communication to the second integrated record. The replication data storage unit 122 has replication data 122a obtained by sequentially arranging the first integrated records and the second integrated records in time order and by copying, to the cell that becomes a blank field of the first integrated record, the data of the second integrated record positioned on the closest first line from the first integrated record. Furthermore, the replication data storage unit 122 has replication data 122b in which a single line of the first integrated record is replicated and the data of the second integrated records positioned up to the closest second lines has been copied from the first integrated record.

In the same manner, if the number of second integrated records to be copied is represented by n, the replication data storage unit 122 has replication data 122n obtained by replicating the first integrated record by the number corresponding to (n−1) lines and by copying each of the pieces of data of the second integrated records positioned up to the closest $n^{th}$ line from the first integrated record. Namely, a certain first integrated record is represented by L, the number of the first integrated records at the time at which the data of the second integrated record was copied can be represented by L1, L2, . . . , and Ln.

Each of the replication data 122a to the replication data 122n has items, such as "time", "transmission source IP", "transmission destination IP", "transmission source port", "transmission destination port", "command type", and "command content". Furthermore, each of the items is the same as that in the integrated data storage unit 121; therefore, descriptions thereof will be omitted. Furthermore, in the replication data 122a to the replication data 122n, NA is added to the blank field of the second integrated record that is a copy source of the data. In this case, NA is treated as one of variations in the second integrated record associated with communication.

A description will be given here by referring back to FIG. 1. The learned model storage unit 123 stores therein a learned model that has been obtained by performing deep learning on the replication data, i.e., the conversion data whose format has been converted. The learned model stores therein, for example, various parameters (weighting factor) of neural networks, method of tensor decomposition, and the like.

The control unit 130 is implemented by, for example, a central processing unit (CPU), a micro processing unit (MPU), or the like executing, in a RAM as a work area, the program that is stored in an inner storage device. Furthermore, the control unit 130 may also be implemented by, for example, an integrated circuit, such as an application specific integrated circuit (ASIC), a field programmable gate array (FPGA), or the like. The control unit 130 includes a generating unit 131, a learning unit 132, a comparing unit 133, and a distinguishing unit 134 and implements or performs the function or the operation of the information processing described below. Furthermore, the internal configuration of the control unit 130 is not limited to the configuration illustrated in FIG. 1 but may also be another configuration as long as the information processing, which will be described later, is performed.

The generating unit 131 acquires, via, for example, the communication unit 110, learning purpose training data from another terminal. Namely, the generating unit 131 is an example of an input unit that inputs input data in which a record that has one of a plurality of formats each having a plurality of items is used as a unit of data. The generating unit 131 generates integrated data by forming the acquired training data to an integrated format. The generating unit 131 generates integrated data by forming, for example, as indicated by the data 17 obtained based on the log A and the log B illustrated in FIG. 5, the pieces of data each having a format of the training data to the integrated format in which the items included in each of the formats cut of the plurality of formats are integrated. The generating unit 131 stores the generated integrated data in the integrated data storage unit 121.

After having generated the integrated data, the generating unit 131 generates, in the cell that becomes a blank field of the first integrated record associated with the first format, replication data that is obtained by copying the data of the second integrated record associated with the second format. Here, the number of the second integrated records to be copied is represented by n and the number of first integrated records to be replicated is represented by (n−1). The generating unit 131 generates the replication data by associating the second integrated records positioned up to the closest $n^{th}$ line with the first integrated record. Namely, n represents the number of association lines of the second integrated records with respect to the first integrated records. Furthermore, the generating unit 131 generates, only at the first time, both the replication data positioned up to the closest $n^{th}$ line and the replication data positioned up to the closest $n+1^{th}$ line. The generating unit 131 stores the generated replication data in the replication data storage unit 122. Furthermore, n is increased, the generating unit 131 stores, in the replication data storage unit 122, the generated replication data each time. Namely, in the replication data storage unit 122, the replication data is sequentially stored starting from n=1. Furthermore, if there is a plurality of cells each of which becomes a blank field of the first integrated record, data of the second integrated record may also be copied to at least one or more blank fields.

In the following, generating the replication data will be described with reference to FIG. 15. FIG. 15 is a diagram illustrating an example of generating replication data. The example illustrated in FIG. 15 indicates generating the replication data in a case where an integrated record 40 is set to the first integrated record and integrated records 41 and 42 are set to the second integrated records. The generating unit 131 gradually increases the possible combinations between connections by copying the data in the cells associated with the integrated records 41 and 42 to the blank field (field indicated by the symbol of ?) in the integrated record 40. Namely, the generating unit 131 replicates the integrated record 40 by one and set as integrated records 40a and 40b. Then, the generating unit 131 copies the data of the integrated record 41 to the integrated record 40a. Furthermore, the generating unit 131 copies the data of the integrated record 42 to the integrated record 40b. Thus, in the integrated records 40a and 40b, data is included all of the items and combinations of the integrated records 40, 41, and 42 can be represented.

After having generated the replication data, the generating unit 131 divides the generated replication data in order to perform cross-validation. The generating unit 131 generates learning purpose data and evaluation purpose data by using, for example, K-fold cross-validation or Leave One Out Cross Validation (LOOCV). Furthermore, if an amount of training data is small and if an amount of replication data is also small, the generating unit 131 may also verify whether correct determination has been performed by using the replication data that has been used for the learning. The generating unit 131 outputs the generated learning purpose data to the learning unit 132. Furthermore, the generating unit 131 outputs the generated evaluation purpose data to the comparing unit 133.

In other words, the generating unit 131 generates the conversion data (replication data) by generating a plurality of integrated records each having an integrated format from a plurality of records regarding each of the units of data included in the input data. Furthermore, the generating unit 131 generates the conversion data (replication data) by setting the cell, in the item, in which data of the first integrated record associated with the first format is insufficient, to be a blank field and by copying the data of the second integrated record associated with the second format into the cell that has been set to be the blank field. Furthermore, the generating unit 131 sequentially arranges both the first integrated record and the second integrated record in time order and replicates, if the number of second integrated records is equal or greater than two, the first integrated record by the number corresponding to the number of insufficient pieces of data. The generating unit 131 generates the conversion data (replication data) by sequentially copying, to the first integrated record, the data of the second integrated records starting from the most recent time. Furthermore, the generating unit 131 converts, between the item having the first format and the item having the second format, regarding the items that are convertible with each other, the item of the second format to the item of the first format.

A description will be given here by referring back to FIG. 1. If the learning purpose data is input from the generating unit 131, the learning unit 132 learns the learning purpose data and generates a learned model. Namely, the learning unit 132 performs tensor decomposition on the learning purpose data and generates a core tensor (partial graph structure). The learning unit 132 obtains an output by inputting the generated core tensor to a neural network. The learning unit 132 learns a parameter of tensor decomposition such that an error of the output value is decreased and the determination result is increased. Flexibility is present in tensor decomposition, an example of the parameter of tensor decomposition includes a combination of a decomposition model, constraint, an optimization algorithm, and the like. An example of the decomposition model is canonical polyadic (CP) decomposition or Tucker decomposition. An example of constraints includes orthogonal constraints, sparse constraints, smooth constraints, nonnegative constraints, or the like. An example of the optimization algorithm includes alternating least square (ALS), higher order singular value decomposition (HOSVD), higher order orthogonal iteration of tensors (HOOT), and the like. In deep tensor, tensor decomposition is performed under the constraint in which the "determination result is increased".

When the learning unit 132 has completed the learning of learning purpose data, the learning unit 132 stores the learned model in the learned model storage unit 123. At this time, in the learned model storage unit 123, both the learned model associated with the number of association lines n of the replication data and the learned model associated with the number of association lines n+1 are arranged to be stored. Namely, the learning unit 132 generates, only at the first time, two learned models, i.e., the learned model associated with the number of association lines n and the learned model associated with the number of association lines n+1. The learning unit 132 moves, in a step at the number of association lines of n=2 and the subsequent steps, the learned model associated with the previous number of association lines n+1 to the learned model associated with the number of association lines n and generates the learned model that is associated with the newly learned number of association lines n+1. Furthermore, regarding the neural network, various kinds of neural networks, such as a recurrent neural network (RNN), may be used. Furthermore, regarding the learning method, various kinds of methods, such as error back-propagation method, may be used.

In other words, the learning unit 132 allows a learning machine, which performs tensor decomposition on the input tensor data and performs deep learning, to learn the conversion data (replication data). Furthermore, the learning unit 132 generates the first learned model that has learned conversion data based on the second integrated records positioned up to the closest $n^{th}$ line from the first integrated record from among the generated pieces of conversion data (replication data). Furthermore, the learning unit 132 generates the second learned model that has learned the conversion data based on the second integrated records positioned up to the closest $n+1^{th}$ line from the conversion data (replication data).

If learning of learning purpose data has been completed in the learning unit 132, the comparing unit 133 refers to the learned model storage unit 123 and compares, by using the evaluation purpose data input from the generating unit 131, the classification accuracy of the evaluation purpose data. Namely, the comparing unit 133 compares the classification accuracy of the evaluation purpose data in a case where the learned model associated with the number of association lines of the closest n is used with the classification accuracy of the evaluation purpose data in a case where the learned model associated with the number of association lines of the closest n+1.

The comparing unit 133 determines, as a result of comparison, whether the classification accuracy of the number of association lines of the closest n is substantially the same as the classification accuracy of the number of association lines of the closest n+1. Furthermore, comparing the classification accuracy may also be determined based on whether the compared classification accuracy is the same. If the comparing unit 133 determines that the classification accuracy of the number of association lines of the closest n is not substantially the same as the classification accuracy of the number of association lines of the closest n+1, the comparing unit 133 instructs the generating unit 131 to increment the number of association lines n and to generate the next replication data. If the comparing unit 133 determines that the classification accuracy of the number of association lines of the closest n is substantially the same as the classification accuracy of the number of association lines of the closest n+1, the comparing unit 133 stores, in the learned model storage unit 123, the learned model associated with the number of association lines of the closest n at that time, i.e., the learned model in the number of association lines n, and the subject number of association lines n. Namely, the learned model in the number of association lines n at that time is in a state in which the classification accuracy does not vary. Consequently, in the embodiment, even if an amount of training data is enormous, it is possible to generate a learned model without variation in combinations becoming an impractical size.

In other words, the comparing unit 133 compares, by using the evaluation purpose data that is based on the generated conversion data (replication data), the classification accuracy between the first learned model and the second learned model. The comparing unit 133 outputs the first learned model and n that is the number of pieces of association of the second integrated record with respect to the first integrated record in a case where the n is increased until the compared pieces of classification accuracy become equal.

After having generated the learned model, the distinguishing unit 134 acquires new data and outputs the distinguished result obtained by performing determination by using the learned model. The distinguishing unit 134 receives and acquires via, for example, the communication unit 110, new data of the distinction target from another terminal. The distinguishing unit 134 generates the integrated data of the distinction target by forming the acquired new data to the integrated format that is the same as that used at the time of learning.

The distinguishing unit 134 refers to the learned model storage unit 123 and acquires the learned model at the time of the number of association lines n used for determination and the subject number of association lines n. The distinguishing unit 134 associates, based on the acquired number of association lines n, the second integrated records positioned up to the closest $n^{th}$ line with the first integrated record of the integrated data that is the distinction target and then generates the replication data of the distinction target.

The distinguishing unit 134 determines, by using the learned model at the time of acquired number of association lines of n, the replication data of the distinction target. Namely, the distinguishing unit 134 constructs a neural network in which various parameters of the learned model have been set and set a tensor decomposition method. The distinguishing unit 134 performs tensor decomposition on the generated replication data of the distinction target, inputs the replication data to the neural network, and acquires the distinguished result. The distinguishing unit 134 displays the acquired distinguished result to the display unit 111 by outputting the acquired distinguished result or storing the acquired distinguished result in the storage unit 120 by outputting the result.

Figure 16:
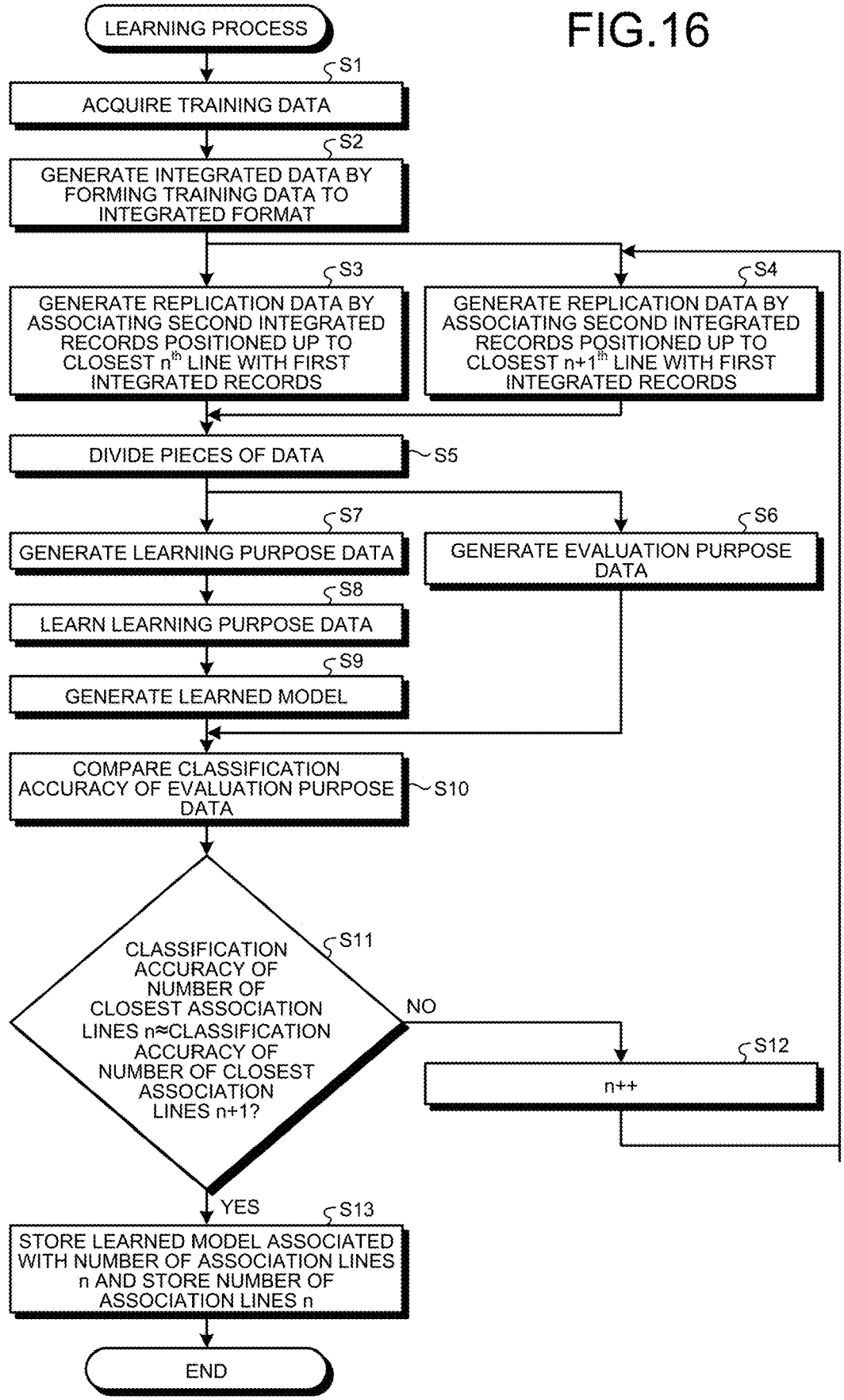
FIG. 16 is a flowchart illustrating an example of a learning process according to the embodiment.

In the following, an operation of the learning device 100 according to the embodiment will be described. First, a learning process for generating a learned model will be described. FIG. 16 is a flowchart illustrating an example of the learning process according to the embodiment.

The generating unit 131 acquires learning purpose training data from, for example, another terminal (Step S1). The generating unit 131 forms the training data to the integrated format and generates integrated data (Step S2). The generating unit 131 stores the generated integrated data in the integrated data storage unit 121.

When the generating unit 131 generates the integrated data, the generating unit 131 associates the second integrated records positioned up to the closest $n^{th}$ line with the first integrated record and generates replication data that contains data up to the closest $n^{th}$ line (Step S3). Furthermore, the generating unit 131 associates the second integrated records up to the closest $n+1^{th}$ line with the first integrated records and generates replication data that contains data up to the closest $n+1^{th}$ line (Step S4). The generating unit 131 stores the generated replication data in the replication data storage unit 122.

When the generating unit 131 generates the replication data, the generating unit 131 divides the generated replication data in order to perform cross-validation (Step S5). The generating unit 131 generates evaluation purpose data that is based on the cross-validation (Step S6). Furthermore, the generating unit 131 generates learning purpose data that is based on the cross-validation (Step S7). The generating unit 131 outputs the generated learning purpose data to the learning unit 132. Furthermore, the generating unit 131 outputs the generated evaluation purpose data to the comparing unit 133.

If the learning purpose data is input from the generating unit 131, the learning unit 132 learns the learning purpose data (Step S8) and generates a learned model (Step S9). Furthermore, the learning unit 132 generates, only the first time, two learned models, i.e., a learned model that is associated with the number of association lines n and a learned model that is associated with the number of association lines n+1. After having completed the learning of the learning purpose data, the learning unit 132 stores the learned model in the learned model storage unit 123.

If the learning of the learning purpose data has been completed in the learning unit 132, the comparing unit 133 refers to the learned model storage unit 123 and compares the classification accuracy of the evaluation purpose data by using the evaluation purpose data that has been input from the generating unit 131 (Step S10). The comparing unit 133 determines, based on the result of comparison, whether the classification accuracy of the number of the closest association lines n is substantially the same as the classification accuracy of the closest association lines n+1 (Step S11). If the comparing unit 133 determines that the classification accuracy of the closest association lines n is not substantially the same as the classification accuracy of the closest association lines n+1 (No at Step S11), the comparing unit 133 increments the number of association lines n (Step S12). Furthermore, the comparing unit 133 instructs the generating unit 131 to generate the subsequent replication data and returns to Step S4.

If the comparing unit 133 determines that the classification accuracy of the closest association lines n is substantially the same as the classification accuracy of the closest association lines n+1 (Yes at Step S11), the comparing unit 133 stores the learned model associated with the number of association lines n and the number of association lines n in the learned model storage unit 123 (Step S13) and ends the learning process. Consequently, the learning device 100 can prevent (suppress) the degradation of the distinction accuracy due to the generation of the integrated record. Namely, the learning device 100 can learn, in the example of the remote operation, the data associated with an appropriate communication establishment action close to a command. Namely, the learning device 100 can generate a learned model having high generalization.

Figure 17:
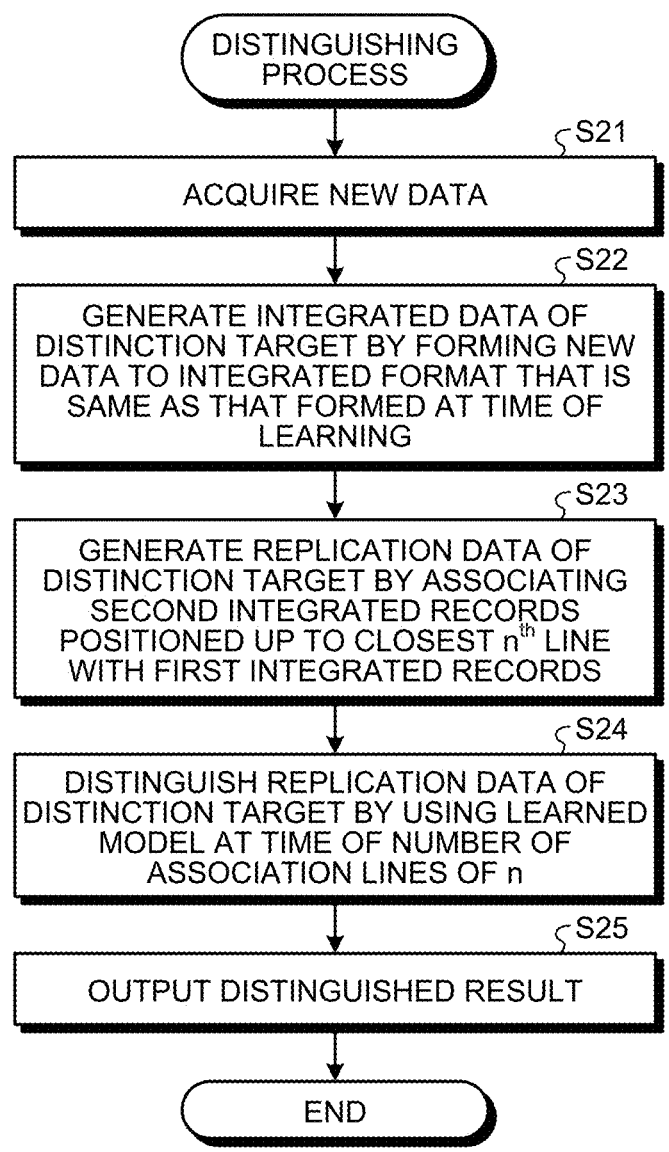
FIG. 17 is a flowchart illustrating an example of a distinguishing process according to the embodiment.

Subsequently, a distinguishing process for distinguishing new data will be described. FIG. 17 is a flowchart illustrating an example of the distinguishing process according to the embodiment.

The distinguishing unit 134 receives and acquires new data of the distinction target from, for example, another terminal (Step S21). The distinguishing unit 134 forms the acquired new data to the integrated format that is the same as that formed at the time of learning and generates integrated data of the distinction target (Step S22).

The distinguishing unit 134 refers to the learned model storage unit 123 and acquires the learned model to be used at the time of number of association lines n and the number of association lines n. The distinguishing unit 134 associates, based on the acquired number of association lines n, the second integrated records positioned up to the closest $n^{th}$ line with the first integrated record of the integrated data of the distinction target and generates replication data of the distinction target (Step S23).

The distinguishing unit 134 distinguishes the replication data of the distinction target by using the acquired learned model at the time of number of association lines of n (Step S24). The distinguishing unit 134 outputs the distinguished result to, for example, the display unit 111 and causes the display unit 111 to display the distinguished result (Step S25). Consequently, the learning device 100 distinguishes the data of the distinction target by using the learned model in which the degradation of distinction accuracy due to the generation of the integrated record has been prevented, thereby improving, for example, the detection accuracy of an attack of the remote operation. Namely, the learning device 100 can improve the detection accuracy due to an improvement in generalization.

In this way, the learning device 100 inputs input data in which a record that has one of a plurality of formats each having a plurality of items is used as a unit of data. The learning device 100 generates conversion data by generating, regarding each of the units of data included in the input data, a plurality of integrated records each having an integrated format from a plurality of records. Furthermore, the learning device 100 allows a learning machine, performs deep learning by performing tensor decomposition on input tensor, to learn the conversion data. Consequently, the learning device 100 can prevent the degradation of the distinction accuracy due to the generation of the integrated record.

Furthermore, the integrated format in the learning device 100 is a format obtained by integrating the items included in each of the plurality of formats. Consequently, it is possible to integrate pieces of data each having a different format.

Furthermore, the learning device 100 generates the conversion data by setting a cell of an item, in which data of a first integrated record associated with a first format is insufficient, to be a blank field and by copying data of a second integrated record associated with a second format to the cell that has been set to be the blank field. Consequently, it is possible to prevent, the degradation of the distinction accuracy due to the generation of the integrated record.

Furthermore, the learning device 100 sequentially arranges both the first integrated records and the second integrated records in time order and replicates, if the number of second integrated records is equal to or greater than two, the first integrated records by the number corresponding to the number of insufficient first integrated records. Furthermore, the learning device 100 generates the conversion data by sequentially copying the data of the second integrated records to the first integrated records from the most recent time. Consequently, the learning device 100 can sequentially associate the pieces of data in the order in which the relationship is high.

Furthermore, the learning device 100 generates, from among the generated conversion data, a first learned model that has learned the conversion data based on the second integrated records positioned up to the closest $n^{th}$ line from the first integrated record and the second learned model that has learned the conversion data based on the second integrated records positioned up to the closest $n+1^{th}$ line. Furthermore, the learning device 100 uses the evaluation purpose data that is based on the generated conversion data and compares the classification accuracy of the first learned model with the classification accuracy of the second learned model. Furthermore, the learning device 100 outputs the first learned model and the n that is the number of pieces of association of the second integrated records with respect to the first integrated records in a case where the n is increased until the compared pieces of classification accuracy become equal. Consequently, the learning device 100 can prevent over learning while maximizing the classification accuracy of detection. Furthermore, the learning device 100 can try to reduce calculation time in the learning.

Furthermore, the learning device 100 converts, among the items in the first format and the items in the second format, regarding the items that are convertible with each other, the item of the second format to the item of the first format. Consequently, the learning device 100 can combine overlapped items.

Furthermore, in the embodiment described above, as a neural network, an RNN is described as an example; however, the neural network is not limited to this. For example, various neural networks, such as a convolutional neural network (CNN), may also be used. Furthermore, also regarding a method of learning, various known methods may also be used other than the error back-propagation method. Furthermore, the neural network has a multilevel structure formed by, for example, an input layer, an intermediate layer (hidden layer), and an output layer and each of the layers has the structure in which a plurality of nodes are connected by edges. Each of the layers has a function called an "activation function"; an edge has a "weight"; and a value of each of the nodes is calculated from a value of the node in a previous layer, a value of the weight of a connection edge, and the activation function held by the layer. Furthermore, various known methods can be used for the calculation method. Furthermore, as the machine learning, in addition to the neural network, various methods, such as a support vector machine (SVM), may also be used.

Furthermore, the components of each unit illustrated in the drawings are not always physically configured as illustrated in the drawings. In other words, the specific shape of a separate or integrated device is not limited to the drawings. Specifically, all or part of the device can be configured by functionally or physical separating or integrating any of the units depending on various loads or use conditions. For example, the generating unit 131 and the learning unit 132 may also be integrated. Furthermore, each of the process illustrated in the drawings is not limited to the order described above and may also be simultaneously performed or may also be performed by changing the order of the processes as long as the processes do not conflict with each other.

Furthermore, all or any part of various processing functions performed by each unit may also be executed by a CPU (or a microcomputer, such as an MPU, a micro controller unit (MCU), or the like). Furthermore, all or any part of various processing functions may also be, of course, executed by programs analyzed and executed by the CPU (or the microcomputer, such as the MPU or the MCU), or executed by hardware by wired logic.

Figure 18:
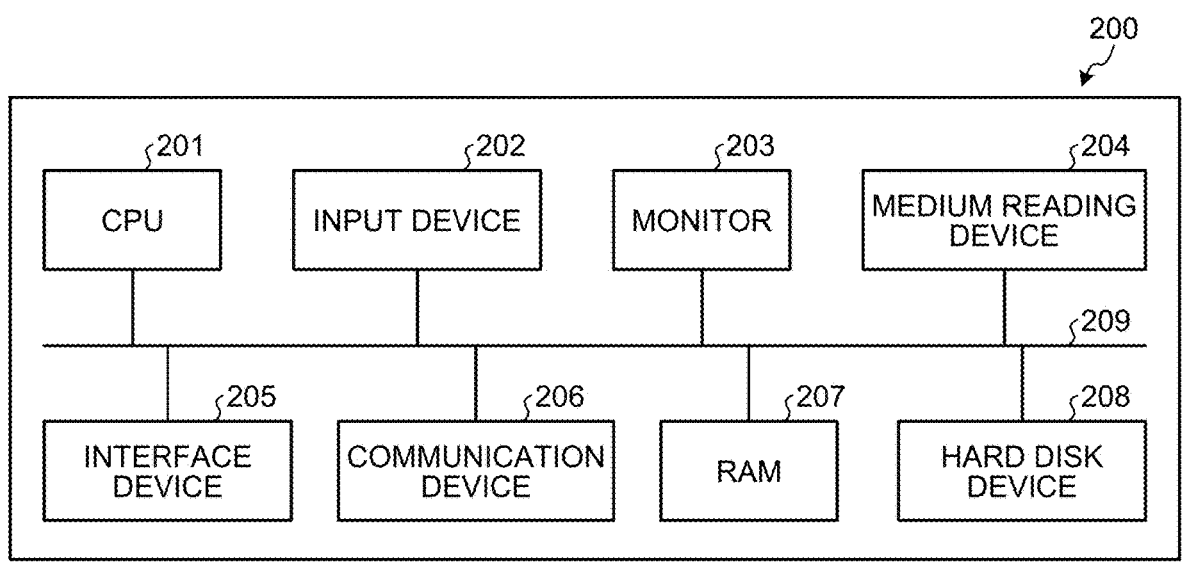
FIG. 18 is a diagram illustrating an example of a computer that executes a learning program.

The various processes described in the above embodiment can be implemented by programs prepared in advance and executed by a computer. Accordingly, in the following, an example of a computer that executes programs having the same function as that described in the embodiments described above will be described. FIG. 18 is a diagram illustrating an example of the computer that executes a learning program.

As illustrated in FIG. 18, a computer 200 includes a CPU 201 that executes various kinds arithmetic processing, an input device 202 that receives an input of data, and a monitor 203. Furthermore, the computer 200 includes a medium reading device 204 that reads programs or the like from a storage medium, an interface device 205 that is used to connect various devices, and a communication device 206 that is used to connect to the other information processing apparatuses in a wired or wireless manner. Furthermore, the computer 200 includes a RAM 207 that temporarily stores therein various kinds of information and a hard disk device 208. Furthermore, each of the devices 201 to 208 is connected to a bus 209.

The hard disk device 208 stores therein a learning program having the same function as that performed by each of the processing units, such as the generating unit 131, the learning unit 132, the comparing unit 133, and the distinguishing unit 134, illustrated in FIG. 1. Furthermore, the hard disk device 208 stores therein the integrated data storage unit 121, the replication data storage unit 122, the learned model storage unit 123, and various kinds of data that implements the learning program. The input device 202 receives an input of various kinds of information, such as operation information, from, for example, an administrator of the computer 200. The monitor 203 displays, for example, various screens, such as a display screen, with respect to the administrator of the computer 200. For example, a printer device or the like is connected to the interface device 205. The communication device 206 has the same function as that performed by, for example, the communication unit 110 illustrated in FIG. 1, is connected to a network (not illustrated), and sends and receives various kinds of information to and from the other information processing apparatuses.

The CPU 201 reads each of the programs stored in the hard disk device 208 and loads and executes the programs in the RAM 207, thereby executing various kinds of processing. Furthermore, these programs can allow the computer 200 to function as the generating unit 131, the learning unit 132, the comparing unit 133, and the distinguishing unit 134 illustrated in FIG. 1.

Furthermore, the learning program described above does not always need to be stored in the hard disk device 208. For example, the computer 200 may also read and execute the program stored in a storage medium that can be read by the computer 200. Examples of the computer 200 readable storage medium include a portable recording medium, such as a CD-ROM, a digital versatile disc (DVD), a universal serial bus (USB) memory, or the like, a semiconductor memory, such as a flash memory or the like, and a hard disk drive. Furthermore, the learning program may also be stored in a device connected to a public circuit, the Internet, a LAN, or the like and the computer 200 may also read and execute the learning program from the recording medium described above.

It is possible to prevent the degradation of the distinction accuracy due to the generation of an integrated record.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A non-transitory computer-readable recording medium having stored therein a program that causes a computer to execute a process comprising:

inputting input data including one or more records that have one of a plurality of formats, each of the plurality of formats including a plurality of items comprising at least one of time data, transmission data, reception data, or command data;

generating conversion data by converting the one or more records into an integrated record having an integrated format, the integrated format being generated from the plurality of formats by integrating the items included in each of the plurality of formats together into the integrated format; and causing a learner to execute a machine learning process by inputting the conversion data as data for learning, the learner outputting a distinguished result by inputting a core tensor to a neural network, the core tensor comprising partial graph structures derived by performing structural restriction tensor decomposition on an input tensor, the machine learning process including training the neural network and updating parameters of the structural restriction tensor decomposition based on loss of the neural network, wherein the generating includes generating the conversion data by setting a cell of an item, in which data of a first integrated record associated with a first format is insufficient, to be a blank field and by copying data of a second integrated record associated with a second format to the cell that has been set to be the blank field.

2. The non-transitory computer-readable recording medium according to claim 1, wherein the generating includes generating the conversion data by:

sequentially arranging both the first integrated records and the second integrated records in a time order;

replicating the first integrated records and the second integrated records when a number of the second integrated records is equal to or greater than two and the first integrated record is a number corresponding to a number of insufficient first integrated records; and sequentially copying the data of the second integrated records into the first integrated records from a most recent time.

3. The non-transitory computer-readable recording medium according to claim 2, wherein the learning process includes:

generating, from among the generated conversion data, a first learned model that has learned the conversion data based on the second integrated records positioned up to a closest $n^{th}$ line from the first integrated records and a second learned model that has learned the conversion data based on the second integrated records positioned up to a closest $n+1^{th}$ line;

comparing, by using evaluation purpose data that is based on the generated conversion data, classification accuracy of the first learned model with classification accuracy of the second learned model; and outputting the first learned model and the n that is a number of pieces of association of the second integrated records with respect to the first integrated records in a case where the n is increased until the compared classification accuracy becomes equal.

4. The non-transitory computer-readable recording medium according to claim 1, wherein the generating includes converting, among the items in the first format and the items in the second format that are convertible with each other, the item of the second format to the item of the first format.

5. A learning method comprising:

inputting input data including one or more records that have one of a plurality of formats, each of the plurality of formats including a plurality of items comprising at least one of time data, transmission data, reception data, or command data, using a processor;

generating conversion data by converting the one or more records into an integrated record having an integrated format, using the processor, the integrated format being generated from the plurality of formats by integrating the items included in each of the plurality of formats together into the integrated format; and causing a learner to execute a machine learning process using the conversion data as data for learning, the learner outputting a distinguished result by inputting a core tensor to a neural network, the core tensor comprising partial graph structures derived by performing structural restriction tensor decomposition on an input tensor, using the processor, the machine learning process including training the neural network and updating parameters of the structural restriction tensor decomposition based on loss of the neural network, wherein the generating includes generating the conversion data by setting a cell of an item, in which data of a first integrated record associated with a first format is insufficient, to be a blank field and by copying data of a second integrated record associated with a second format to the cell that has been set to be the blank field.

6. A learning device comprising:
a memory; and
a processor coupled to the memory, wherein the processor executes a process comprising: inputting input data including one or more records that have one of a plurality of formats, each of the plurality of formats including a plurality of items comprising at least one of time data, transmission data, reception data, or command data;

generating conversion data by converting the one or more records into an integrated record having an integrated format from the one or more records the integrated format being generated from the plurality of formats by integrating the items included in each of the plurality of formats together into the integrated format; and causing a learner to execute a machine learning process using the conversion data as data for learning, the learner outputting a distinguished result by inputting a core tensor to a neural network, the core tensor comprising partial graph structures derived by performing structural restriction tensor decomposition on an input tensor, the machine learning process including training the neural network and updating parameters of the structural restriction tensor decomposition based on loss of the neural network, wherein the generating includes generating the conversion data by setting a cell of an item, in which data of a first integrated record associated with a first format is insufficient, to be a blank field and by copying data of a second integrated record associated with a second format to the cell that has been set to be the blank field.

* * * * *